April 20, 1926. 1,581,835
C. BROWN
ADJUSTABLE CONCAVE
Filed Oct. 1, 1925 2 Sheets-Sheet 1
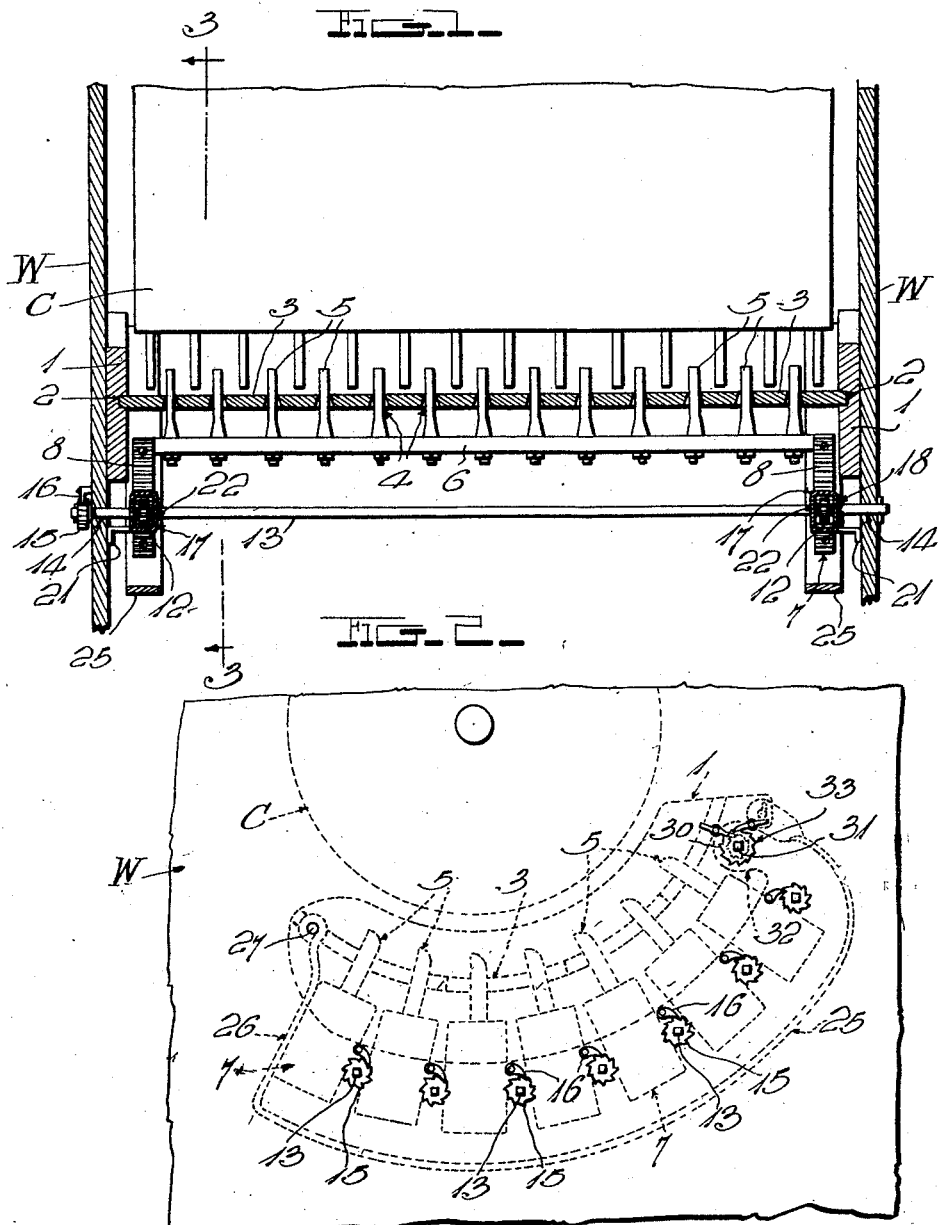
Inventor
Cecil Brown

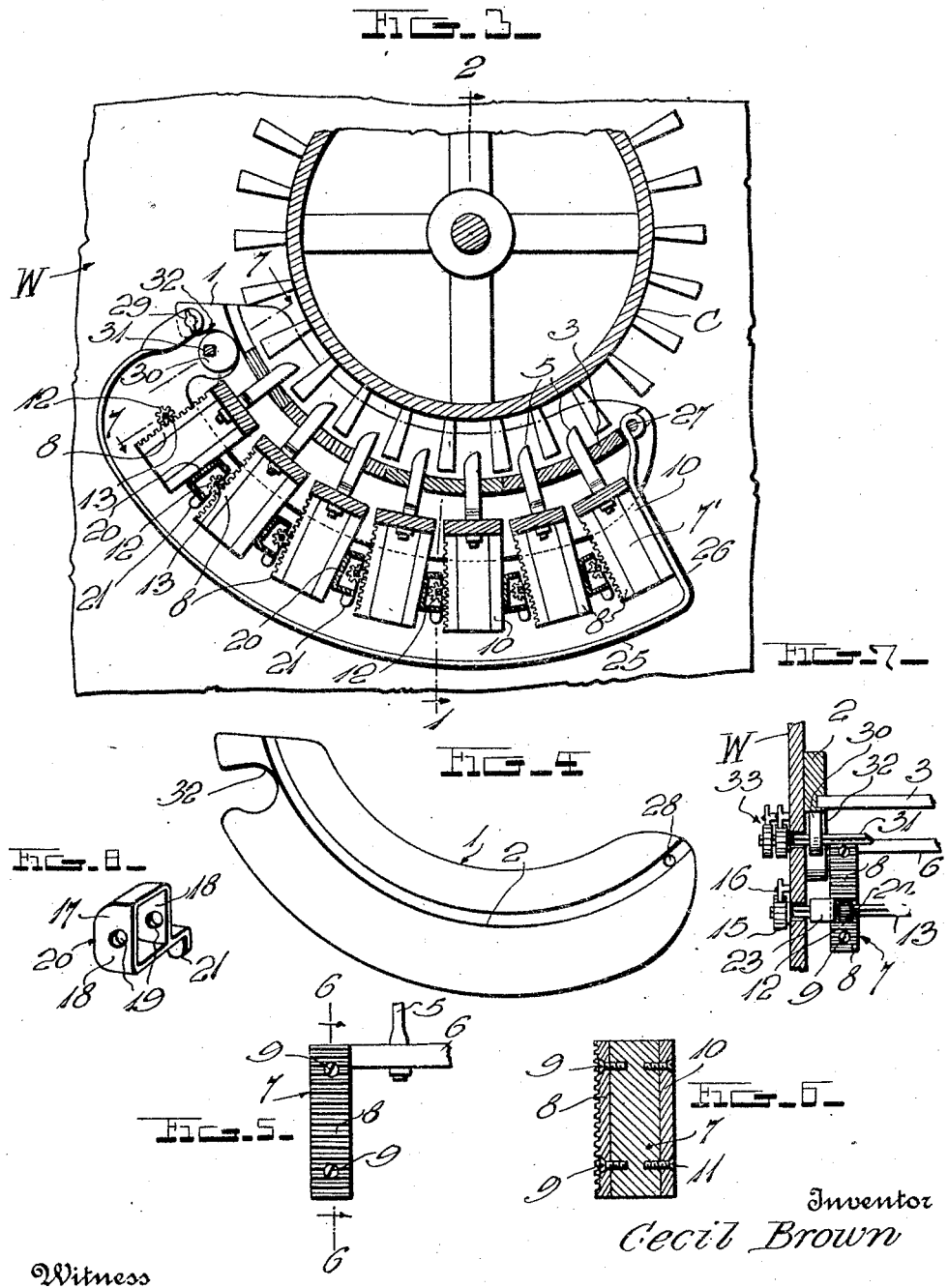

Patented Apr. 20, 1926.

1,581,835

UNITED STATES PATENT OFFICE.

CECIL BROWN, OF PATTONSBURG, MISSOURI.

ADJUSTABLE CONCAVE.

Application filed October 1, 1925. Serial No. 59,949.

*To all whom it may concern:*

Be it known that I, CECIL BROWN, a citizen of the United States, residing at Pattonsburg, in the county of Daviess and State of Missouri, have invented certain new and useful Improvements in Adjustable Concaves; and I do declare the following to be a full, clear, and exact description of the invention, such as will enable others skilled in the art to which it appertains to make and use the same.

My invention relates to improvements in concaves such as those used on threshing machines, and it is one object of the invention to provide a new and improved construction in which the teeth of the concave may be adjusted to any desired extent with respect to a concavo-convex plate through which they pass, so that with practically no trouble, the concave may be adjusted for threshing different kinds of produce.

The adjustable teeth of the concave are carried by parallel bars having arms at the ends provided with rack teeth which mesh with gears on parallel relatively stationary shafts, and further objects are to provide unique guards for the gears which serve also as stabilizing means for the arms of the tooth-carrying bars; to provide novel arcuate stop-bars which limit the movement of the tooth-carrying bars and their arms, away from the concavo-convex plate; to provide these stop-bars with lateral terminals at one end which co-operate with the gear guards in stabilizing the tooth-carrying bars and their arms; to pivotally mount the lateral terminals of the stop-bars at such points as to permit the pivot means to also retain sections of the above-named plate, within grooves of arcuate carrying members provided for said plate; to connect the other ends of the arcuate stop-bars with the carrying members; to provide means for swinging these members and the stop bars as single units about the pivot means of the lateral ends of said stop-bars; and to provide a generally simple and efficient structure.

With the foregoing in view, the invention resides in the novel subject matter hereinafter described and claimed, the description being supplemented by the accompanying drawings.

Figure 1 is a longitudinal sectional view through an adjustable concave constructed in accordance with my invention, illustrating it in operative relation with a threshing cylinder.

Figure 2 is an end elevation of the parts shown in Fig. 1.

Figure 3 is a vertical transverse sectional view on line 3—3 of Fig. 1, and this view also indicates the line on which Fig. 1 is cut.

Figure 4 is an inner side elevation of one of the arcuate supports for the sectional concave plate.

Figure 5 is an enlarged fragmentary side elevation of a portion of one of the tooth-carrying bars.

Figure 6 is a detail sectional view on line 6—6 of Fig. 5.

Figure 7 is a detail longitudinal section as indicated by line 7—7 of Fig. 3.

Figure 8 is a perspective view of one of the gear guards.

In the drawings above briefly described, C designates an ordinary form of toothed threshing cylinder, and W refers to walls of a thresher disposed at opposite ends of said cylinder. A pair of arcuate supports 1 are provided under the cylinder C, at the inner sides of the walls W, the inner side of each of these supports being formed with a longitudinal groove 2. The two grooves receive the sections 3 of an arcuate concavo-convex plate, said sections being in the form of bars having openings 4 through which teeth 5 pass. These teeth are of any desired design and are secured detachably in any appropriate manner to a plurality of parallel tooth-carrying bars 6 which are disposed in parallel relation with the sectional plate, and have their ends disposed in abutting relation with the supports 1. The ends of the bars 6 are provided with lateral rigid arms 7 which project away from the aforesaid plate, the edges of these arms which face in one direction, being provided with rack bars 8 detachably secured in place by screws or the like 9. The edges of the arms 7 which face in the opposite direction, are provided with wear-plates 10 which are detachably secured thereto by screws or the like 11. The rack bars 8 mesh with small gears 12 on a plurality of parallel, preferably square shafts 13, said shafts passing rotatably through appropriate openings 14 in the walls W and being adapted to be rotated by a suitable wrench or the like, so that the gears 12 and the rack bars 8 are caused to adjust the tooth-carrying bars 6, thus permitting the teeth 5 to be projected to any desired distance through the plate 3—3, or permitting them to be disposed flush with the inner concave side of this plate when desired. Any suitable means, such as the ratchet wheels 15 and dogs 16, may be provided to lock the shafts 13 in adjusted position.

Guards 17 are provided for the gears 12, said guards having parallel side members 18 which abut opposite sides of said gears. These side members are formed with openings 19 through which the shafts 13 pass rotatably, and the backs 20 of said guards contact with the wear-plates 10 of all of the arms 7 except the two arms at one edge of the concave. For future references, the one arm of this pair, shown in Fig. 3, is designated at 7'. I have shown the guards 17 provided with lateral projections 21 which abut the walls W and hold said projections against outward movement upon the shafts 13, and cotter pins or the like 22 may be employed to hold said guards against inward movement. Thus, the guards in turn hold the gears 12 against sliding along the shafts, and insure that they shall remain in mesh with the rack bars 8. The gears 12 at the edge of the concave, remote from the arms 7', need not be provided with guards, but I have shown spacing sleeves 23 between them and the walls W, and pins 24 carried by the shafts at the inner sides of the gears, to hold them against sliding.

Two arcuate guard bars 25 are provided at the outer ends of the arms 7, to be engaged by said arms so as to limit the outward movement thereof, and prevent total withdrawal of the teeth 5 from the openings 4. At one end, the bars 25 are provided with lateral terminals 26 which are pivoted upon a transverse rod 27. This rod passes through openings 28 in one end of the arcuate supports 1, the rod being located across the open ends of the grooves 2, so that it will normally hold the plate sections 3 in proper position in said grooves. The ends of the rod 27 also pass through the side walls W to form pivotal supporting means for the supporting members 1. The opposite ends of the bars 25 are detachably connected by set screws or the like 29, with the ends of the members 1 remote from the terminals 26, and means are associated with the last mentioned ends of the supports 1 for adjusting them toward and from the cylinder C. As this adjustment takes place, both supports swing about the rod 27 as a pivot, and the plate sections 3 and bars 25 move with said supports, as a single unit.

Eccentrics 30 are shown upon a shaft 31 and received in notches 32 in the supports 1 for effecting adjustment of the latter. The ends of the shaft 31 pass rotatably through openings in the walls W and any appropriate dog and ratchet means or the like 33, may be employed to lock the shaft against rotation in either direction after adjustment.

The lateral terminals 26 of the guard bars 25 form abutments engaging the wear-plates 10 of the arms 7' to effectively hold these arms against movement in one direction, and the gears 12 with which their rack bars 8 mesh, hold them against movement in the opposite direction. The guards 17 of these gears hold the next adjacent pair of arms 7 against lateral movement in one direction, the gears 12 co-operating with these arms, hold them against movement in the other direction, and so on to the opposite edge of the concave. The result is that all of the arms and the tooth-carrying bars 6 thereof, are effectively stabilized and guided whenever they are adjusted.

By rotating any of the shafts 13, the adjacent teeth 5 may be disposed at any desired position, and obviously, the teeth of any bar or bars 6, may be adjusted independently of those of the other bars, and whenever desired the shaft 31 may be rotated to swing the sectional plate 3—3, toward or from the cylinder C. It will thus be seen that the concave may be readily adjusted, quickly and easily, according to the produce to be threshed. Moreover, the concave will be efficient and reliable in any of its adjusted conditions.

As excellent results are obtainable from the details disclosed, such details may well be followed. However, within the scope of the invention as claimed, numerous modifications may be made.

I claim:

1. An adjustable concave comprising a plate of concavo-convex form in transverse section and having openings, parallel bars at the convex side of said plate having teeth passing slidably through said openings, arms on the ends of said bars projecting away from said plate, stationarily mounted shafts parallel with said bars and extending between said arms, gears carried by said shafts, rack teeth on the edges of the arms which face in one direction, said rack teeth meshing with said gears, guards for said gears contacting with the edges of the arms which face in the other direction, with the exception of said edges of the two arms at one extreme of the concave, and abutments engaging said edges of said two arms.

2. A structure as specified in claim 1; together with means for holding said guards against movement along the shafts, said guards having openings through which said shafts pass and being provided with side portions abutting opposite sides of said gears to hold the latter against sliding along said shafts, 3. An adjustable concave comprising a plate of concavo-convex form in transverse section and having openings, parallel bars at the convex side of said plate having teeth passing slidably through said openings, arms on the ends of said bars projecting away from said plate, stationarily mounted shafts parallel with said bars and extending between said arms, gears carried by said shafts, rack teeth on the edges of the arms which face in one direction, said rack teeth meshing with said gears, guards for said gears contacting with the edges of the arms which face in the other direction, with the exception of said edges of the two arms at one extreme of the concave, a pair of arcuate stop bars concentric with the concave and disposed at the outer ends of the aforesaid arms to limit the outward movement thereof, said bars having laterally directed terminals at one end abutting said edges of said two arms at one extreme of the concave and pivotally mounted at said extreme, and releasable fastenings for the other ends of said bars.

4. A structure as specified in claim 3; said plate being formed of sections, arcuate supports for the ends of the plate sections having open-ended grooves removably receiving said section ends, pivot means for one end of said arcuate supports passing across the open ends of said grooves to hold the plate sections in place, said lateral terminals of said stop bars being pivoted on said pivot means, and said releasable fastenings for the other ends of the stop bars being connected to the other ends of said arcuate supports, and adjustable supporting means for said other ends of said supports.

5. An adjustable concave comprising a plate of concavo-convex form in transverse section and having openings, a pair of arcuate supports at the ends of the plates, parallel bars at the convex side of the plate having teeth slidable through said openings, arms on the ends of said bars projecting away from said plate, rack teeth on the edges of said arms facing in one direction, wear-plates on the opposite edges of said arms, stationary shafts arranged parallel with the bars and having portions disposed adjacent the rack teeth, gears carried by the shafts and meshing with said rack teeth, guards enclosing portions of certain of said gears and having flat walls slidably contacting with the wear-plates and having openings to receive said shafts, and lateral projections rigidly inter-connecting the guards and the adjacent arcuate supports whereby to prevent relative transverse shifting of the gears and rack teeth.

In testimony whereof I have hereunto affixed my signature.

CECIL BROWN.